United States Patent
Nguyen et al.

(10) Patent No.: US 8,803,704 B2
(45) Date of Patent: Aug. 12, 2014

(54) TRAFFIC SIGNAL LOADING PLATFORM

(75) Inventors: Truong-Khoa Nguyen, Saint-Laurent (CA); Benoit Essiambre, Boisbriand (CA); Christian Poirier, Montreal (CA)

(73) Assignee: GE Lighting Solutions, LLC, Cleveland, OH (US)

( * ) Notice: Subject to any disclaimer, the term of this patent is extended or adjusted under 35 U.S.C. 154(b) by 476 days.

(21) Appl. No.: 13/052,570

(22) Filed: Mar. 21, 2011

(65) Prior Publication Data

US 2012/0242506 A1  Sep. 27, 2012

(51) Int. Cl.
G08G 1/09 (2006.01)
H05B 37/02 (2006.01)
G08G 1/095 (2006.01)

(52) U.S. Cl.
CPC ............ H05B 37/0245 (2013.01); *Y02B 20/72* (2013.01); H05B 37/029 (2013.01); *G08G 1/095* (2013.01)
USPC ........... 340/905; 340/906; 340/907; 340/908; 340/438; 340/439

(58) Field of Classification Search
USPC .................................. 340/905–909, 438, 439
See application file for complete search history.

(56) References Cited

U.S. PATENT DOCUMENTS

| 6,127,784 A | 10/2000 | Grossman et al. |
|---|---|---|
| 6,153,985 A | 11/2000 | Grossman |
| 6,236,331 B1 | 5/2001 | Dussureault |
| 6,448,716 B1 | 9/2002 | Hutchison |
| 6,667,623 B2 | 12/2003 | Bourgault et al. |
| 6,982,648 B2 | 1/2006 | Cros et al. |
| 7,733,242 B2 * | 6/2010 | Bertels et al. ................ 340/926 |
| 2003/0067220 A1 | 4/2003 | Cros et al. |
| 2007/0234300 A1 | 10/2007 | Leake et al. |
| 2010/0026520 A1* | 2/2010 | Witte et al. ................... 340/908 |
| 2010/0182164 A1 | 7/2010 | Diba |
| 2011/0012757 A1* | 1/2011 | Pashel ........................... 340/906 |

FOREIGN PATENT DOCUMENTS

| EP | 0565992 B1 | 6/2000 |
|---|---|---|
| EP | 1298009 B1 | 4/2004 |
| JP | 2007 299201 | 11/2007 |
| WO | WO 2010/067246 | 6/2010 |

OTHER PUBLICATIONS

EP 12160034 Search Report.

* cited by examiner

*Primary Examiner* — Tai T Nguyen
(74) *Attorney, Agent, or Firm* — Fay Sharpe LLP

(57) ABSTRACT

A system and method for setting operating parameters of traffic lamps. A traffic lamp including a memory operates according to one or more operating parameters on the memory. A loading device external to the traffic lamp transfers one or more operating parameters to the traffic lamp, where the traffic lamp sets the operating parameters to the transferred operating parameters.

9 Claims, 4 Drawing Sheets

TRAFFIC SIGNAL LOADING PLATFORM

BACKGROUND

The present exemplary embodiments relate generally to lighting. They find particular application in conjunction with traffic lamps, and will be described with particular reference thereto. However, it is to be appreciated that the present exemplary embodiments are also amenable to other like applications.

Traffic signals are typically disposed along roads to control the flow of traffic and/or make intersections more visible. Traffic signals may also be employed to provide warning to motorists, such as at railroad crossings. Traffic signals may include one or more traffic lamps, each having one or more light sources, such as LEDs, disposed therein. Typical colors used in traffic lamps include red, yellow and green.

One problem with traditional traffic lamps is that they are often designed and manufactured to meet a predetermined set of operating parameters. Operating parameters may define the operating characteristics of a traffic lamp and/or enable and/or disable features of a traffic lamp. To make modifications to the operating parameters of a traffic lamp generally requires modifications to the hardware of the traffic lamp.

As should be appreciated, this reduces the flexibility of traffic lamps. Manufacturers may need to design traffic lamps for each set of different operating parameters consumers may need. Further, shopkeepers may need to keep large numbers of shop-keeping units (SKUs) for traffic lamps having different operating parameters. Additionally, consumers may not be able to reuse existing traffic lamps when their needs change, unless the needed operating parameters remain the same.

The present disclosure contemplates new and improved systems and/or methods for remedying this and other problems.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to an aspect of the present disclosure, a system for setting operating parameters of traffic lamps and/or providing software updates to traffic lamps is provided. The system includes a traffic lamp including a memory, where the traffic lamp operates according to one or more operating parameters on the memory. The system further includes a loading device external to the traffic lamp. The loading device provides one or more software updates and/or transfers one or more operating parameters to the traffic lamp, where the traffic lamp replaces at least one of the operating parameters on the memory with at least one of the transferred operating parameters and/or implements one or more software updates.

According to another aspect of the present disclosure, a programmable traffic lamp is provided. The traffic lamp includes one or more light sources, a memory including one or more operating parameters, and a controller. The controller controls the light sources according to the operating parameters. Further, the controller receives software updates and/or one or more operating parameters from an external loading device and replaces at least one of the operating parameters of the memory with at least one of the received operating parameters.

According to another aspect of the present disclosure, a method for updating software and/or setting operating parameters of traffic lamps is provided. New software and/or one or more operating parameters are received from a source external to a traffic lamp, where the traffic lamp includes a memory and operates according to one or more operating parameters on the memory. The received software and/or operating parameters are transferred to the traffic lamp, where the traffic lamp replaces the software and/or at least one of the operating parameters of the memory with at least one of the transferred operating parameters.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
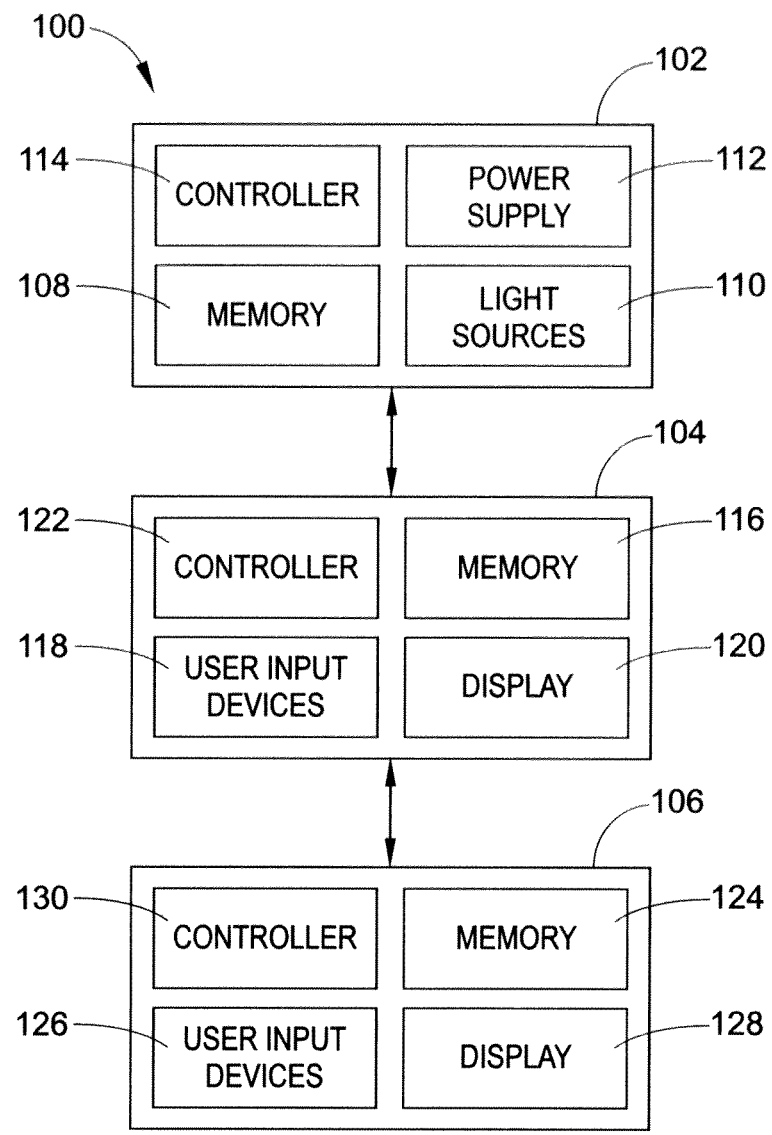
FIG. 1 is a block diagram of a system for setting operating parameters and/or updating software of traffic lamps according to aspects of the present disclosure.

One or more embodiments or implementations are hereinafter described in conjunction with the drawings, where like reference numerals are used to refer to like elements throughout, and where the various features are not necessarily drawn to scale.

With reference to FIG. 1, a block diagram of a system 100 for updating software and/or setting one or more operating parameters of traffic lamps is provided. Operating parameters may define the operating characteristics of a traffic lamp and/or enable and/or disable features of a traffic lamp. Examples of operating parameters include light source current, options boards, operating voltage, dimming, and the like. Manufacturers of traffic lamps suitably employ the system 100, but other users, such as consumers, are equally amenable. The system 100 may include one or more of a traffic lamp 102, a loading device 104, a programming device 106, and the like.

Figure 2:
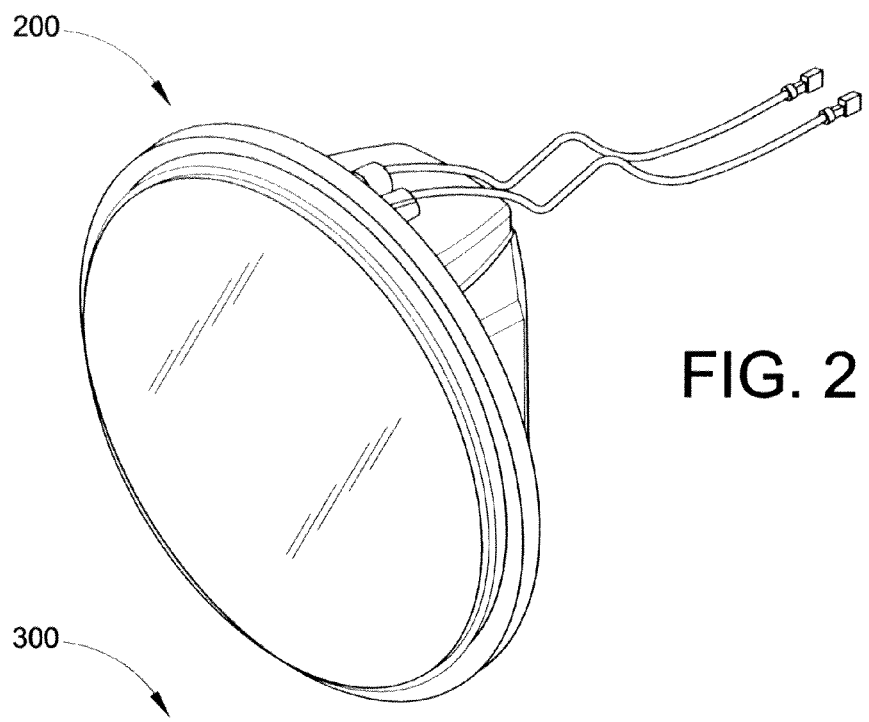
FIG. 2 is a perspective view of a traffic lamp.

The traffic lamp 102 is suitably disposed within a traffic signal. In certain embodiments, the traffic lamp 102 may be a traffic lamp such as a traffic lamp 200 of FIG. 2. The traffic lamp 102 may include one or more of a memory 108, one or more light sources 110, a power supply 112, a controller 114, and the like.

The memory 108 may store operating parameters and/or updated software for the traffic lamp 102. The memory 108 may include one or more of a magnetic disk or other magnetic storage medium; an optical disk or other optical storage medium; a random access memory (RAM), read-only memory (ROM), flash memory, or other electronic memory device or chip or set of operatively interconnected chips; and the like.

The light sources 110 may generate light for the traffic lamp 102. Suitably, the light sources 110 include one or more LEDs. However, the light sources 110 may alternatively, or additionally, include one or more fluorescent tubes, halogen bulbs, and the like. The light sources 110 may be selected to control Correlated Color Temperature (CCT), Color Rendering Index (CRI) and other like characteristics of light. Further, the light sources 110 may be selected to ensure a wide operating temperature range and long life. In certain embodiments, the color of the light sources 110 may be one or more of yellow, green and red.

The power supply 112 may receive power from an external power source (not shown) and distribute said power to the constituent components of the traffic lamp 102. The power supply 112 may include one or more of a rectifier, surge protection circuit, an electromagnetic interference circuit, a switching power supply, a conflict monitor, a power factor correcting circuit, and the like. The power supply 112 may further receive commands from the controller 114 and/or an external device (not shown), controlling the distribution of said power. The external device may, for example, be a traffic signal controller.

The controller 114 may control the light sources 110 according to operating parameters stored on the memory 108. For example, the controller 114 may dim the light sources 110 according to a dimming operating parameter on the memory 108.

The controller 114 may further facilitate modification of the operating parameters based upon operating parameters received from an external device. Namely, the controller 114 may overwrite and/or merge the operating parameters of the memory 108 with the operating parameters received from the external device. In certain embodiments, the controller 114 may receive operating parameters by reading a memory of an external device. For example, during initialization, the controller 114 may determine whether an external device is present and, if so, attempt to read personality parameters therefrom. Suitably, the external device is the loading device 104, but other external devices are equally amenable.

The controller 114 may further facilitate reading of the operating parameters on the memory 108. Namely, the controller 114 may respond to requests from an external device for one or more operating parameters on the memory 108. As with modification of the operating parameters, the external device is suitably the loading device 104.

The controller 114 suitably communicates with each of one or more of the memory 108 and an external device via a digital communications protocol, such as I2C, USB, RS-232, RS-485, 1 Wire, SPI, WiFi, and the like. However, analog communications protocols are equally amenable. The communications protocol may be carried over one or more of a data bus, a communications network, and the like.

The controller 114 may include a digital/electronic processor, such as a microprocessor, microcontroller, graphic processing unit (GPU), and the like. In such embodiments, the controller suitably executes instructions stored on a memory. In certain embodiments, the memory is the memory 108 of the traffic lamp 102. In other embodiments, the memory is local to the controller and one of ROM, EPROM, EEPROM, Flash memory, and the like.

The loading device 104 may facilitate the loading of operating parameters and/or software updates to the traffic lamp 102. The loading device 104 may also facilitate the reading of operating parameters from the traffic lamp 102. The loading device 104 may include one or more of a memory 116, one or more user input devices 118, a display 120, a controller 122, and the like.

The memory 116 may store the updated software and/or one or more sets of operating parameters. Each of the sets of operating parameters may correspond to a different "personality" for the traffic lamp 102 and may include one or more operating parameters. In certain embodiments, the traffic lamp 102 may read operating parameters directly from the memory 116.

The memory 116 may include one or more of a magnetic disk or other magnetic storage medium; an optical disk or other optical storage medium; a random access memory (RAM), read-only memory (ROM), flash memory, or other electronic memory device or chip or set of operatively interconnected chips; and the like. In certain embodiments, the memory 116 may be removable from the loading device 104. For example, the memory may include a USB thumb drive, a SD card, a compact flash card, a memory stick, a PC card, and the like.

The user input devices 118 may allow a user of the loading device 104 to control it. As an example, the user input devices 118 may allow a user of the loading device 104 to instruct the loading device 104 to load the traffic lamp 102 with a first set of operating parameters on the memory 116. The user input devices 118 may include one or more of switches, buttons, a mouse, a keyboard, a touch screen, and the like.

The display 120 may allow the loading device 104 to provide a user of the loading device 104 with messages. The display 120 may include an LCD, a plasma display, a projector, one or more LEDs, and the like.

The controller 122 may control the loading device 104 to load operating parameters and/or one or more software updates to the traffic lamp 102. The controller 122 may act as a bridge between the programming device 106 and the traffic lamp 102. In such embodiments, the controller 122 may receive software updates and/or operating parameters from the programming device 106 and coordinate with the traffic lamp 102 to transfer data to the traffic lamp 102. The controller 122 may additionally, or alternatively, coordinate with the traffic amp 102 to transfer operating parameters stored on the memory 116 to the traffic lamp 102.

To transfer operating parameters and/or software, the controller 122 may have the traffic lamp 102 read operating parameters and/or updated software from a memory of the loading device 104, where the memory may be the memory 116, an emulated memory, or the like. In other embodiments, the controller 122 may transfer operating parameters and/or software by writing to the memory 108 of the traffic lamp 102. In certain embodiments, the user input devices 118 and/or the display 120 may allow a user to initiate a transfer and/or selection of operating parameters. In other embodiments, the programming device 106 may allow a user to initiate a transfer and/or selection of operating parameters.

The controller 122 may further control the loading device 104 to load operating parameters to the memory 116. In certain embodiments, the controller 122 may receive operating parameters from the programming device 106, which it then stores to the memory 116. In other embodiments, the controller 122 may receive operating parameters from the user input devices 118, which it then stores to the memory 116.

The controller 122 may further facilitate the reading of operating parameters from the traffic lamp 102. In such embodiments, the controller 122 may read the operating parameters directly from the memory 108 of the traffic lamp 102 in response to a request for operating parameters. Alternatively, the controller 122 may read the operating parameters via the controller 114 of the traffic lamp 102 in response to a request for operating operators. The request may be from, for example, an external device. The controller 122 may then provide the requestor with the requested operating parameters and/or at least one software update. For example, the controller 122 may provide the programming device 106 with requested operating parameters.

Suitably, the controller 122 communicates with each of one or more of the memory 116, the programming device 106 and the traffic lamp 102 via a digital communications protocol, such as I2C, USB, RS-232, RS-485, 1 Wire, SPI, WiFi, and the like. However, analog communications protocols are equally amenable. The communications protocol may be carried over one of a data bus, a communications network, and the like. In certain embodiments, the traffic lamp 102 and loading device 104 share a data bus, a communications network, or the like.

The controller 122 may include a digital/electronic processor, such as a microprocessor, microcontroller, graphic processing unit (GPU), and the like. In such embodiments, the controller 122 suitably executes instructions stored on a memory. In certain embodiments, the memory is the memory 116 of the loading device 104. In other embodiments, the memory is local to the controller 122 and one of ROM, EPROM, EEPROM, Flash memory, and the like.

Figure 3:
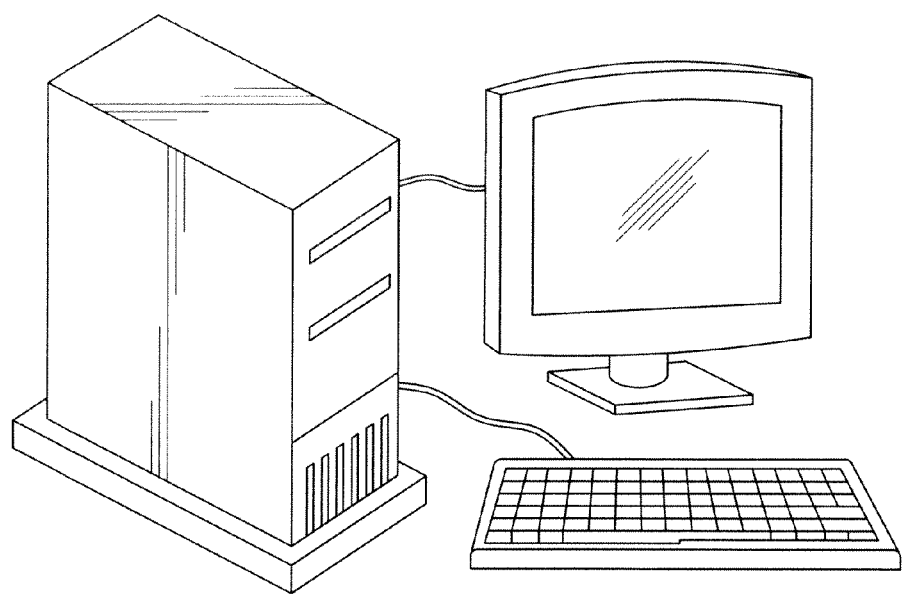
FIG. 3 is a perspective view of a personal computer.

The programming device 106 is suitably a computer, such as a computer 300 of FIG. 3. However, other devices may be employed. For example, the programming device 106 may be a server and/or a memory. The programming device 106 may include one or more of a memory 124, one or more user input devices 126, a display 128, a controller 130, and the like.

The memory 124 suitably stores executable instructions for generating and/or manipulating operating parameters and/or software updates on the loading device 104 and/or the traffic lamp 102. The memory 124 may further store operating parameters and/or software updates. The user input devices 126 may allow a user of the programming device 106 to control it. The user input devices 126 may include one or more of switches, buttons, a mouse, a keyboard, a touch screen, and the like. The display 128 may allow the programming device 106 to provide a user of the programming device 106 with messages and/or a graphical user interface. The display 128 may include an LCD, a plasma display, a projector, and the like.

The controller 130 suitably allows a user of the programming device 106 to provide software update to the traffic lamp 102, generate operating parameters, load the traffic lamp 102 with operating parameters via the loading device 104, load the loading device 104 with operating parameters, read operating parameters from the traffic lamp 102 and/or the loading device 104, and the like. However, other tasks are equally amenable. In certain embodiments, the controller 130 accomplishes this by providing the user with a graphical user interface (GUI) via the display 128.

The GUI may allow a user to select a communications protocol to use when communicating with the loading device 104. The GUI may additionally, or alternatively, allow a user to generate and/or manipulate operating parameters and/or loading appropriate software updates for traffic lamp 102. Suitably, a user accomplishes this directly via the GUI and/or indirectly via another program running on the programming device 106. In certain embodiments, a table-like structure is used to facilitate the generation and/or manipulation of operating parameters. The GUI may additionally, or alternatively, allow a user to export and/or import operating parameters to files. For example, the GUI may allow a user to export operating parameters to a CSV file, a TXT file, a XLS file, or the like. The GUI may additionally, or alternatively, allow a user to choose between different targets to upload parameters and/or software update to. The targets may include, but are not limited to, the memory 116 of the loading device 104 or memory emulated by the loading device 104. The GUI may additionally, or alternatively, allow a user to choose between different sources for reading operating parameters. The sources may include one or more of the emulated memory, the memory 116 of the loading device 116, the memory 108 of the traffic lamp 102, and the like. The GUI additionally, or alternatively, may allow the calculation of checksums or any other algorithm that can detect data transmission errors when writing or reading operating parameters.

Suitably, the controller 130 communicates with the loading device 104 via a digital communications protocol, such as I2C, USB, RS-232, RS-485, 1 Wire, SPI, WiFi, and the like. However, analog communications protocols are equally amenable. The communications protocol may be carried over a data bus, a communications network, and the like.

The controller 130 may include a digital/electronic processor, such as a microprocessor, microcontroller, graphic processing unit (GPU), and the like. In such embodiments, the controller 130 suitably executes instructions stored on a memory. These instructions may, for example, include executable instructions embodying the GUI described above. In certain embodiments, the memory is the memory 124 of the programming device 106. In other embodiments, the memory is local to the controller 130 and one of ROM, EPROM, EEPROM, Flash memory, and the like.

Figure 4:
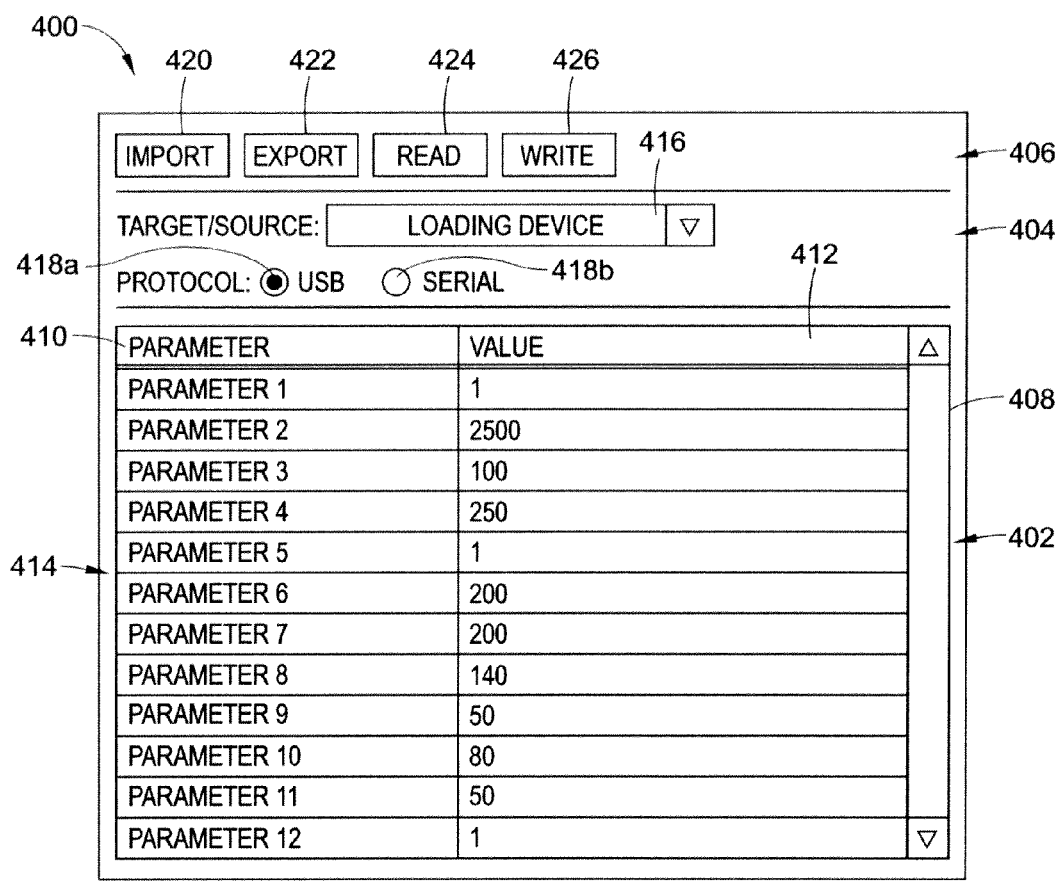
FIG. 4 is a graphical user interface according to aspects of the present disclosure; and, FIG. 5 is a block diagram of a system for setting operating parameters and/or updating software of traffic lamps according to aspects of the present disclosure.

With reference to FIG. 4, a graphical user interface 400 for generating and/or manipulating operating parameters and/or reading and/or writing the operating parameters and/or software updates to the traffic lamp 102 is provided. Suitably, a programming device, such as the programming device 106 of FIG. 1, implements the graphical user interface 400. The GUI 400 may include a data section 402, a communications section 404, a command section 406, and the like.

The data section 402 suitably allows manipulation and/or generation of operating parameters and may include a table 408 of operating parameters. The table suitably includes a parameter column 410 and a value column 412. However, in other embodiments, the table 408 may include additional columns, such as data type, size, data range/values, memory address, and the like. Further, the table 408 suitably includes one or more editable rows 414, where each row may correspond to a different operating parameter. In certain embodiments, the table 408 may further include a blank editable row (not shown) allowing a user to enter a new operating parameter. Rows may be edited by, for example, double clicking on the appropriate cell.

The communications section 404 suitably allows a user of the GUI 400 to select the target and/or source for read and/or write operations. A read operation may include, for example, reading memory of a remote device, such as a loading device and/or a traffic lamp, and a write operation may include, for example, writing to memory of remote device, such as the loading device. In certain embodiments, the communications section may include a target/source drop down 416. The target/source drop down 416 may include a loading device, a traffic lamp, and the like. In certain embodiments, selecting the traffic lamp designates an emulated memory of the loading device. The communication section 404 may additionally, or alternatively, allow a user to select the communications protocol used to communicate with a loading device. In such embodiments, the communications section may include, for example, one or more buttons 418, where each button corresponds to a different communications protocol. Communications protocols include, for example, USB and/or serial.

The command section 406 may include one or more of an import button 420, an export button 422, a read button 424, a write button 426, and the like. The import button 420 suitably allows a user of the GUI 400 to import a file, such as a TXT, a XLS or CSV file, of operating parameters and corresponding values to the data section 402. The export button 422 suitably allows a user of the GUI 400 to export the data section 402 to a file, such as a TXT, a XLS or CVS file. The read button 424 suitably reads operating parameters from the device selected from the target/source dropdown 416 (or the like) to the data section 402. The write button 426 suitably writes operating parameters in the data section 402 to the device selected from the target/source dropdown 416 (or the like).

Optionally, the GUI 400 may include a software update section (not shown), which suitably allows the user to select the proper software to be downloaded to the traffic lamp 102. The updated software may contain executable instructions for the controller 114 within the traffic lamp 102. It may also contain the operating parameters for the traffic lamp 102.

Figure 5:
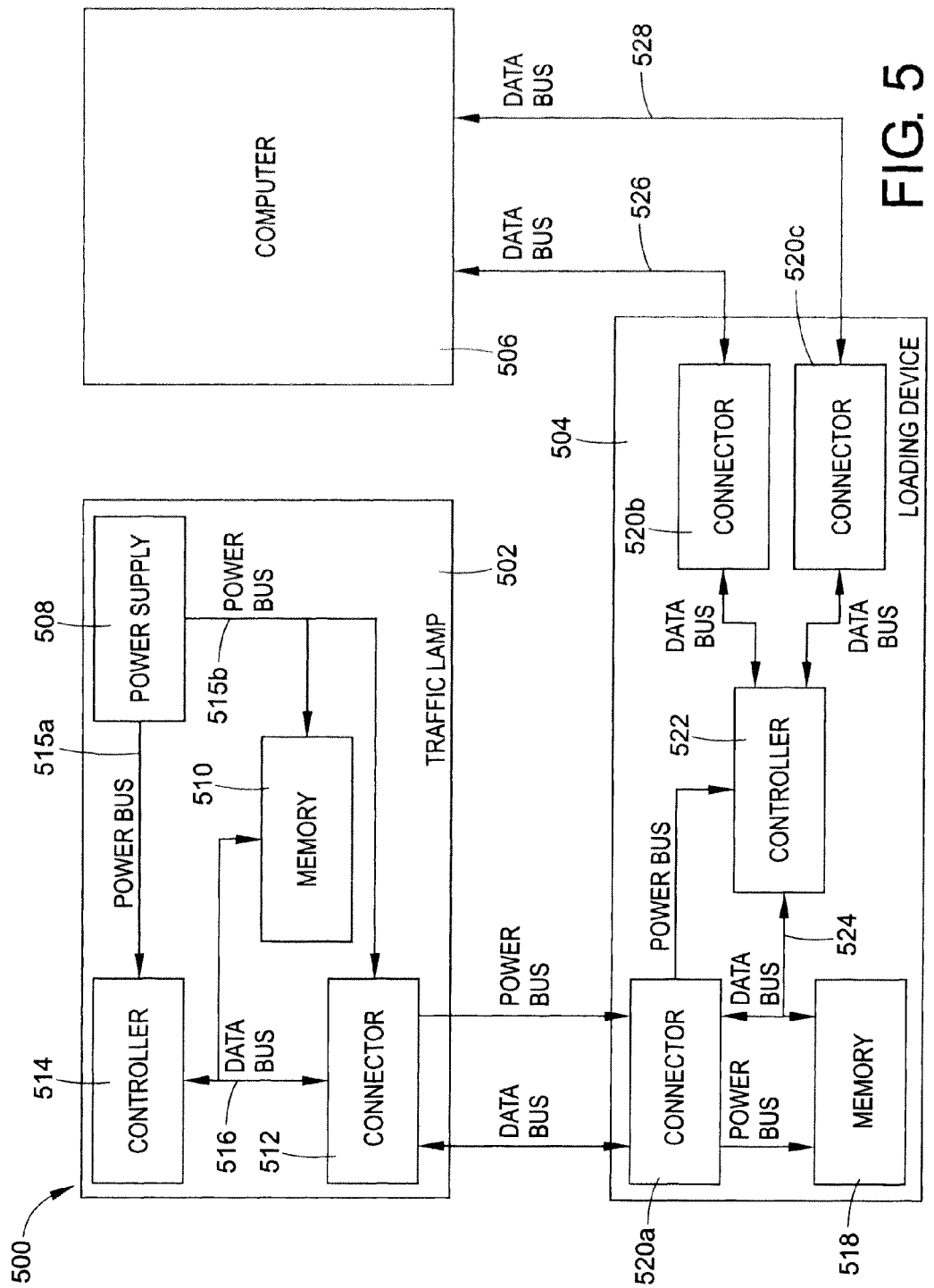

With reference to FIG. 5, a block diagram of a system 500 for setting operating parameters and/or software updates of traffic lamps is provided. The system 500 is a more specific embodiment of the system 100 of FIG. 1. Therefore, the discussion heretofore is equally amenable to the discussion to follow and components described hereafter are to be understood as paralleling like components discussed heretofore, unless noted otherwise. The system 500 may include one or more of a traffic lamp 502, a loading device 504, a programming device 506, and the like.

The traffic lamp 502 is suitably disposed within a traffic signal. In certain embodiments, the traffic lamp 502 may be a traffic lamp such as the traffic lamp 200 of FIG. 2. The traffic lamp 502 may include one or more of a power supply 508, a memory 510, a connector 512, a controller 514, one or more light sources (not shown), and the like.

The power supply 508 may receive power from an external power source (not shown) and distribute said power to the constituent components of the traffic lamp 500 via one or more power buses 515. Said components may include the controller 514, the memory 510, the connector 512, and the light sources. In certain embodiments, the power supply 508 may include a power factor correcting power supply.

The memory 510 may store the software updates and/or operating parameters for the traffic lamp 502. Suitably, the memory 510 includes EEPROM, but other types of memory are equally amenable. For example, the memory 510 may include one or more of a magnetic disk or other magnetic storage medium; an optical disk or other optical storage medium; a random access memory (RAM), read-only memory (ROM), flash memory, or other electronic memory device or chip or set of operatively interconnected chips; and the like.

The connector 512 may connect the traffic lamp 502 to the loading device 504. Suitably, the connector 512 facilitates the transfer of power from the power buses 515 to the loading device 504 and connects a data bus 516 of the traffic lamp 502 to the loading device 504. Communications over the data bus 516 are suitably carried out using a digital communication protocol.

The controller 514 may control the operation of the traffic lamp 502 according to operating parameters disposed on the memory 510. The controller 114 may further facilitate modification of the operating parameters based upon operating parameters received from the loading device 504. The controller 514 may communicate with the memory 510 and/or the loading device 504 via the data bus 516.

The loading device 504 may facilitate the software updates and/or the loading of operating parameters to the traffic lamp 502. In certain embodiments, the loading device 504 may also act as a portable store of traffic lamp operating characteristics, which may be grouped into different personalities. The loading device 504 may include one or more of a memory 518, one or more connectors 520, a controller 522, and the like.

The memory 518 may store one or more sets of operating parameters and/or the updated software. Suitably, the memory 518 includes EEPROM, but other types of memory are equally amenable. For example, the memory 518 may include one or more of a magnetic disk or other magnetic storage medium; an optical disk or other optical storage medium; a random access memory (RAM), read-only memory (ROM), flash memory, or other electronic memory device or chip or set of operatively interconnected chips; and the like.

The connectors 520 may connect the loading device 504 to the traffic lamp 502 and/or the programming device 506. Data transfer may be done using a communication protocol.

The controller 522 may control the transfer of operating parameters and/or the updated software to the traffic lamp 502. Particularly, the controller 522 may coordinate with the traffic lamp 502 and/or the programming device 506 to transfer operating parameters and/or the updated software from the programming device 506 and/or the memory 518 to the traffic lamp 502. In certain embodiments, operating parameters and/or the updated software may be transferred by having the traffic lamp 502 read the data from a memory of the controller 522. In other embodiments, operating parameters and/or software updates may be transferred by writing data to the memory 510 of the traffic lamp 502.

The controller 522 may communicate with the memory 518 via a data bus 524. In certain embodiments, the data bus 524 may be connected to the data bus 516 of the traffic lamp 502, whereby the controller 522 may communicate with the traffic lamp 502 via the data bus 524.

The programming device 506 is suitably a computer, such as a personal computer 300 of FIG. 3. However, other devices may be employed. For example, the programming device 506 may be a server and/or a memory. The programming device 506 suitably allows a user of the programming device 506 to generate operating parameters, load the traffic lamp 502 with operating parameters via the loading device 504, load the loading device 504 with operating parameters, read operating parameters from the traffic lamp 502 and/or the loading device 504, and the like. However, other tasks are equally amenable.

In certain embodiments, the programming device 506 may provide the user with a graphical user interface (GUI) to carry out these tasks. In certain embodiments, the GUI is as described in connection with FIG. 1 and/or FIG. 4. For example, the programming device 506 may allow a user thereof to manipulate operating parameters disposed on the traffic lamp 502 and/or the loading device 504 with a table-like structure.

The programming device 506 may communicate with the loading device 504 via a digital and/or analog communications protocol, such as I2C, USB, RS-232, RS-485, 1 Wire, SPI, WiFi, and the like. The communications protocol may be carried over a data bus, a communications network, and the like.

In view of the discussion heretofore, it should be appreciated that the present disclosure allows for flexibility within a traffic lamp without hardware modifications. The end result is the reduction in the number of SKUs for merchants and easier modification of a traffic lamp by manufacturers and/or consumers.

The disclosure has been made with reference to preferred embodiments. Obviously, modifications and alterations will occur to others upon reading and understanding the preceding detailed description. It is intended that the preferred embodiments be construed as including all such modifications and alterations insofar as they come within the scope of the appended claims or the equivalents thereof.

The invention claimed is:

1. A system for setting internal signal operating and performance parameters and providing software updates of individual traffic signal lamps, said system comprising:
    an individual traffic signal lamp including a memory, said individual traffic signal lamp configured to operate according to one or more internal operating and performance parameters on said memory; and
    a loading device external to said individual traffic signal lamp and different from a traffic signal controller in charge of regulating traffic cycles for one or more intersections, said loading device configured to replace one or more individual signal operating and performance parameters on said memory with at least one of said one or more transferred internal operating and performance parameters and implement one or more software updates.

2. The system of claim 1, wherein the one or more internal operating and performance parameters on the memory of the individual traffic lamp signal include one or more of LED current, options boards, operating voltage, and dimming.

3. The system of claim 1, wherein the internal operating and performance parameters are transferred to the individual traffic lamp signal using a communications protocol.

4. The system of claim 3, wherein the communications protocol is one or more of I2C, USB, RS-232, RS-485, 1 Wire, SPI, and wireless.

5. The system of claim 1, further comprising:
    a programming device comprising a processor and memory storing instructions that, when executed, cause the programming device to transmit the one or more software updates or the one or more internal operating and performance parameters to the loading device.

6. The system of claim 5, wherein the programming device is a computer system.

7. The system of claim 5, wherein the programming device is configured to allow a user thereof to generate or manipulate operating parameters or to select the software to be updated via a graphical user interface.

8. The system of claim 5, wherein the one or more software updates or the one or more internal operating and performance parameters are transmitted to the memory of the loading device.

9. The system of claim 1, wherein the one or more transferred internal operating and performance parameters include one or more internal operating parameters received from a memory local to the loading device.

* * * * *